(No Model.) 2 Sheets—Sheet 2.

V. C. TURNER & K. M. MITCHELL.
WATER HEATER.

No. 585,244. Patented June 29, 1897.

WITNESSES:
Harry S. Rohrer,
Thed. L. Gatchel.

INVENTORS
Volney C. Turner &
Kerr M. Mitchell
BY John J. Halsted
their ATTORNEYS

UNITED STATES PATENT OFFICE.

VOLNEY C. TURNER AND KERR M. MITCHELL, OF ST. JOSEPH, MISSOURI.

WATER-HEATER.

SPECIFICATION forming part of Letters Patent No. 585,244, dated June 29, 1897.

Application filed December 11, 1896. Serial No. 615,368. (No model.)

*To all whom it may concern:*

Be it known that we, VOLNEY C. TURNER and KERR M. MITCHELL, of St. Joseph, in the county of Buchanan and State of Missouri, have invented certain new and useful Improvements in Water-Heaters; and we do hereby declare that the following is a full, clear, and exact description of the invention, which will enable others skilled in the art to which it appertains to make and use the same, reference being had to the accompanying drawings, and to letters of reference marked thereon, which form a part of this specification.

Our invention has for its object the instantaneous or very rapid heating of water; and it consists in an apparatus of special construction which we have devised for this purpose and in various novel features of the same, all of which will be presently herein described.

A leading feature of our invention is that while cold water may be continually supplied at the top of the apparatus the direct action of the heat underneath it is upon the lower one of a series of removable water-holding trays, pans, or shelves placed one above the other with air-spaces between the trays and each tray having openings through it, in which are upwardly-projecting tubes for the products of combustion, and also having a sealing-pipe, the products of combustion having a circuitous or zigzag route upward through the heater and escaping at the top without coming directly in contact with the water, because the top of the seal-pipes do not reach as high as the tubes for the products of combustion, so that there is always air-space above the water in the pans, and the gases therefore do not come in contact with the water.

Figure 1:
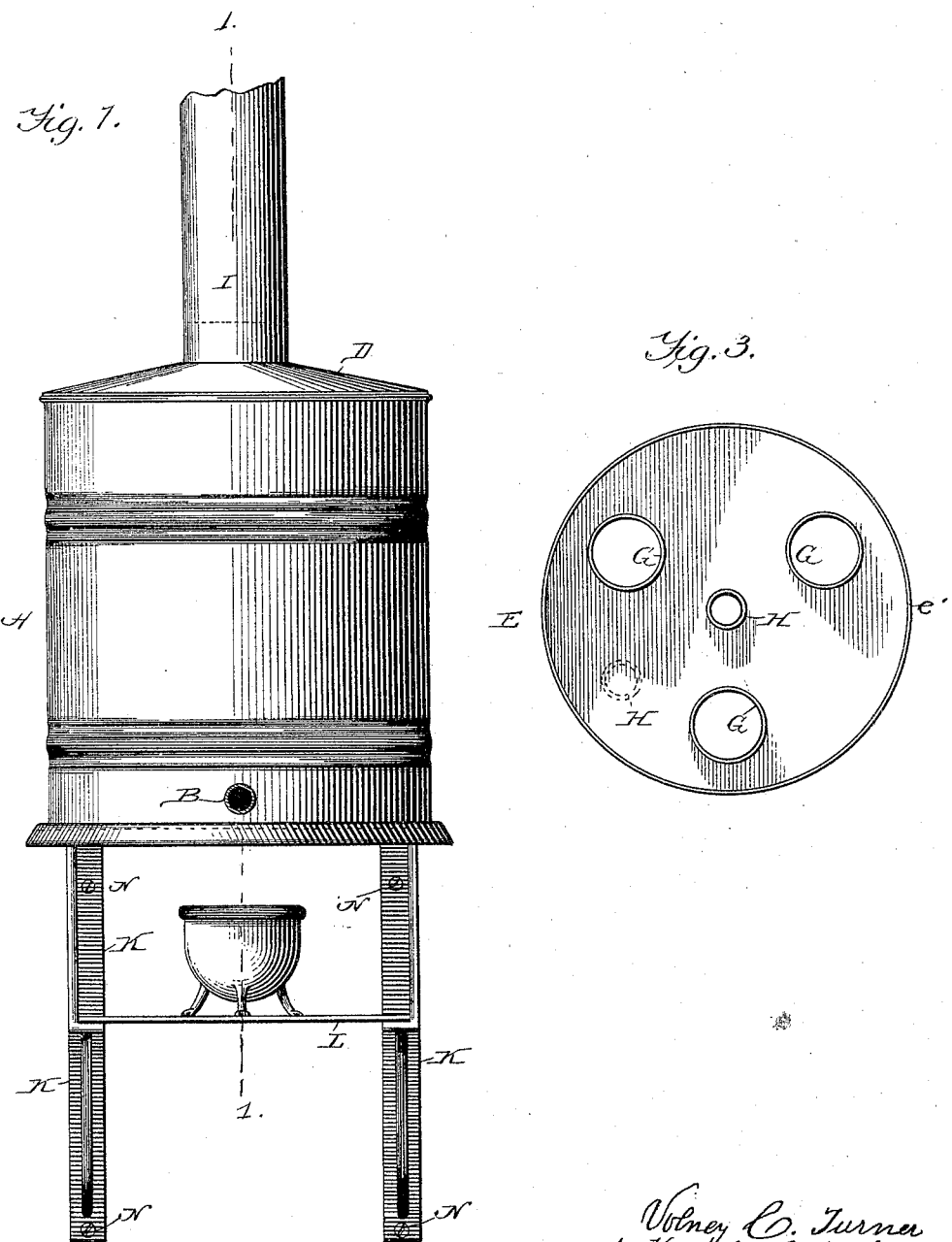
Figure 2:
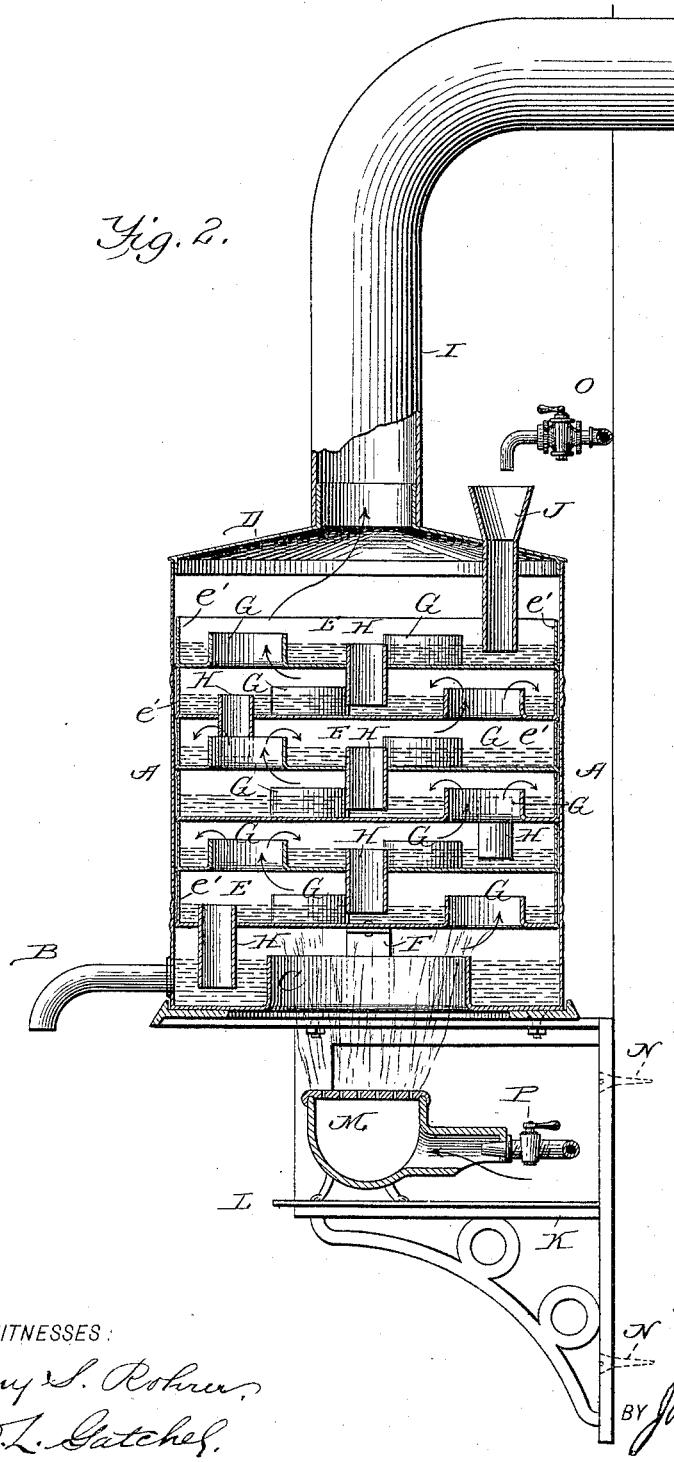

In the drawings which illustrate one form of structure embodying our improvements, Figure 1 is an elevation; Fig. 2, a vertical section through the line 1 1 of Fig. 1, and Fig. 3 a plan view of one of the pans.

A indicates an exterior casing within which the pans are placed one above the other, and this casing has in its bottom a large opening C. The casing is open at its top and is provided with an open valveless spout B near its bottom and a cover D on its top. Inside of this casing are fitted the shelves or pans E E, &c., one above another. These are severally made with a peripheral rim or side $e'$, on which rests the pan next above it, and the lowermost one has legs F for its support and to keep it at the right distance from the bottom of the casing.

The other pans, shown in the present instance as five in number, rest loosely one upon the other, so that they can readily be removed for cleaning or other purposes. The series of pans, when in place, form at their combined perimeters a cylindrical structure and keep the products of combustion from the outside casing A.

Each pan has in it openings (say three in number) to allow the products of combustion to pass up through them, such openings having tubes G fitted tightly therein and which extend upward, as shown, high enough to be above the highest water-line in the pan. Each pan has also a water-seal pipe H, which extends a short distance above the bottom of the pan, but not as high as the tubes G, thus insuring that the water-line shall always be below the top of tubes G. These pipes H also extend below the pans far enough to be immersed in the water in the pan beneath it and thus be water-sealed.

The top cover D is provided with an outlet-pipe I for the products of combustion and also with an inlet funnel and pipe J for the water-supply. This pipe J at its lower end extends down far enough to enter the water in the upper pan, and thus form a water seal. By this means also the supply of water can be readily seen and gaged, and the lid is still left free, being in no wise connected to any other pipe or part, and so as to be immediately removable.

The whole structure may be supported on a bracket K, provided with a shelf L, on which may rest a gas-burner M of any suitable kind. The bracket may be fastened to the wall of a building, as shown, by means of screws, as shown at N. Gas may be turned on to the burner by means of a gas-cock P, and the water may be turned on by a cock O.

The water when turned on runs from the top pan or tray through the seal-pipe H to the next lower pan, and from this in the same manner to the next lower one successively, and from the bottom of the casing it runs from the open spout B, which has no stop-cock to check or prevent a free flow, for if the flow through the spout were arrested while the water continued to be supplied through the pipe J the water would drop through the opening C and fall upon the gas-burner or stove M. The gas-cock being then opened and the gas lighted above the burner M, the products of combustion pass upward, strike against the bottom surface of the lowermost tray, and are deflected by it and move along such surface toward the openings G. The pans are so placed relatively to each other that the openings in all the series of pans do not aline vertically with each other, but, on the contrary, those in each pan are at sides opposite to the corresponding ones in the next pan, thus alternating with each other and compelling a zigzag or circuitous course of these products from side to side of the structure and under each pan, as indicated by the arrows in Fig. 1, until reaching the top outlet I. Heat is thus imparted as fully as practicable to the water in each pan, the bottom one being heated almost instantly upon lighting the gas, inasmuch as it holds a limited supply to be heated. By reason of the air-space above the water-line of each pan and of the fact that this water-line is below the top of the tube G it will be understood that the rising products of combustion do not come in contact with or mix with the water. The water entering at J passes down from one tray to another through the respective seal-pipes H, thereby keeping the water away from these ascending gases or products which are always above the water.

To get an immediate supply of heated water, it will be seen that although the cool water may be in all the pans yet upon lighting the gas the comparatively small portion held by the lower pan receives instantly the intense heat from the burners and that this heat is not wasted on the contents of the other pans. In other words, it is not necessary to heat all the body of water in the apparatus before quickly drawing off a heated supply.

There is no pressure inside the heater, as the products of combustion and vapors or steam, if any, readily escape at the top. Hence the apparatus can be made cheaply. The water simply gravitates through the apparatus and passes out at spout B.

The apparatus makes a cheap, compact, and effective heater, and it can be taken apart and the trays cleaned like dishes.

A very large heating-surface is presented to the hot gases in their circuitous route and at the same time they pass upward toward the escape-pipe at the top.

We claim—

1. In a water-heater, a series of trays for holding water located within an outer casing, each having a similar exterior wall or rim, such rims when the trays of the series are mounted one upon another, serving to form a cylinder to keep away from such casing the products of combustion ascending through the trays, all substantially as shown and described.

2. The water-holding trays or pans, each made with upwardly-projecting tubes for the escape of the products of combustion, and each having also a sealing-tube projecting above the bottom of the pan and serving to supply water to a pan beneath it, and also of a length to project below such bottom and into water in such next lower pan.

3. In combination, the exterior casing, the series of removable pans within such casing, each having therein the passages or tubes for the rising products of combustion, and also having a sealing-tube extending upward to a height below the top of said passages and extending downward to be sealed in the water in the pan next beneath, whereby the products of combustion may ascend through the structure and the water can descend from pan to pan without intermixture or contact of the gases and water, all substantially as set forth.

VOLNEY C. TURNER.
KERR M. MITCHELL.

Witnesses:
JO. F. WOODSON,
WILL. E. WOODSON.